United States Patent [19]

Hasegawa

[11] Patent Number: 4,791,954

[45] Date of Patent: Dec. 20, 1988

[54] SELF-REGULATED PRESSURE CONTROL VALVE

[75] Inventor: Yoshihiko Hasegawa, Hyogo, Japan

[73] Assignee: TLV Co., Ltd., Hyogo, Japan

[21] Appl. No.: 84,441

[22] Filed: Aug. 11, 1987

Related U.S. Application Data

[63] Continuation-in-part of Ser. No. 770,845, Aug. 29, 1985, abandoned.

[30] Foreign Application Priority Data

Oct. 2, 1984 [JP] Japan ............................. 59-207779

[51] Int. Cl.$^4$ ............................................. G05D 16/00
[52] U.S. Cl. ............................. 137/487.5; 137/489.5
[58] Field of Search ................... 137/85, 487.5, 489.5

[56] References Cited

U.S. PATENT DOCUMENTS

| | | | |
|---|---|---|---|
| 3,137,474 | 6/1964 | Soderberg | 137/489.5 X |
| 3,482,588 | 12/1969 | Krueter | 137/85 |
| 3,586,027 | 6/1971 | Fitzgerald | 137/487.5 X |
| 4,550,747 | 11/1985 | Woodworth | 137/487.5 |
| 4,694,390 | 9/1987 | Lee | 137/487.5 X |

Primary Examiner—Alan Cohan
Attorney, Agent, or Firm—Toren, McGeady & Associates

[57] ABSTRACT

A self-regulating pressure control valve, such as, for example, a self-regulated pressure reducing valve, including as the principal components, a pressure control valve, a pressure regulating unit, a driving unit for driving the pressure regulating unit, a control unit for controlling the operation of the driving unit, and a pressure setting unit for establishing a set pressure. The pressure regulating position of the pressure regulating element of the pressure regulating unit is regulated on the basis of the predetermined functional relationship between the pressure regulating position of the pressure regulating element and the controlled pressure so that the pressure regulating element is positioned properly to regulate the controlled pressure to the set pressure. The self-regulated pressure control valve is capable of controlling the controlled pressure at a high response speed.

9 Claims, 3 Drawing Sheets

SELF-REGULATED PRESSURE CONTROL VALVE

BACKGROUND OF THE INVENTION

Cross Reference To Related Application

The present application is a continuation-in-part application of application Ser. No. 770,845 filed Aug. 29, 1985 entitled AUTOMATICALLY SET PRESSURE REDUCING VALVE, which is now abandoned.

The present invention relates to a self-regulated pressure control valve capable of controlling a secondary pressure, namely, the pressure of an associated controlled system, at a predetermined set level through self-regulation of the pressure setting condition thereof on the basis of a control signal corresponding to the current pressure of the controlled system detected by pressure detecting means.

The present invention also relates to a valve for regulating the pressure o a fluid. More particularly, it relates to a pressure reducing valve for reducing the pressure of a fluid on the primary side thereof to maintain a constant fluid pressure on the secondary side thereof.

Pressure reducing valves are generally of the type in which a main valve is directly controlled by the displacement of a diaphragm, or in which a main valve, such as a piston valve, is indirectly controlled by a pilot valve. The secondary pressure of a fluid acts on one side of the diaphragm and the resilient force of a pressure setting spring acts on the other side thereof. If there is any imbalance between the two forces, the diaphragm is displaced to cause a valve member to control the amount of a fluid flowing through the valve to maintain a secondary fluid pressure corresponding to the resilient force of the spring.

An adjusting screw which is threadedly connected to a valve casing is used for setting a desired secondary fluid pressure. The screw is manually turned to adjust the resilient force of the pressure setting spring until a pressure gauge indicates the desired pressure. This arrangement is very inconvenient when the set pressure is frequently changed. It does not permit remote operation or automatic control.

Thus, there is known in the prior art an automatic control valve operating in accordance with a working principle whereby the value to be controlled is detected and compared with a target value and the judgment or instruction based on any difference therebetween is processed into a signal for controlling a valve member actuator, such as an electric motor or fluid actuator.

In case it is a pressure reducing valve, the secondary pressure is detected by a pressure sensor and compared with the target value which is applied through a setting mechanism and the result of the comparison is processed into a signal for bringing an actuator, such as an electric motor, into proportional or differential/integral control action. This valve, therefore, facilitates any change in target value and permits remote operation or automatic control.

The automatic control valve is, however, expensive. This is due to the fact that an actuator having a high output and a controller for the complicated processing of signals are required for actuating the valve member directly, minutely and quickly.

It is slower in response than a pressure reducing valve including a diaphragm. This is due to the fact that the actuator is not directly connected to the signal processor.

SUMMARY OF THE INVENTION

The applicant of the present invention has proposed an automatic pressure reducing diaphragm valve in the parent application, Ser. No. 770,845, identified above (Japanese Patent Application No. 59-207779). This automatic pressure reducing diaphragm valve comprises a pressure reducing diaphragm valve unit, a pressure setting unit including a pressure setting spring, an actuator for operating the pressure setting unit and a control unit which provides a control signal to actuate the actuator when the pressure deviation of a detected secondary pressure, namely, the controlled pressure, from a target pressure exceeds a predetermined reference deviation so that the pressure deviation is reduced to zero.

This automatic pressure reducing diaphragm valve is capable of stable pressure reducing operation to stabilize the through mechanical action while the pressure deviation of the secondary pressure is below the reference pressure deviation.

Accordingly, it is an object of the present invention to provide a pressure reducing valve which includes an actuator having a small output and, yet, which facilitates any change in pressure setting and permits remote operation and automatic control.

Since the automatic pressure reducing diaphragm valve regulates the secondary pressure on the basis of the result of comparison between the detected pressure deviation and the reference pressure deviation, it does take a long time to stabilize the secondary pressure at the predetermined set pressure, however.

Accordingly, it is another object of the present invention to provide a self-regulated pressure control valve capable of rapidly adjusting the secondary pressure to a predetermined set value.

The present invention also utilizes the functional relation between the position of pressure regulating means and the secondary pressure of a self-regulated pressure reducing valve including the pressure regulating means and driving means for driving the pressure regulating means.

To achieve the object of the invention, the invention provides a self-regulated pressure control valve comprising: a pressure control valve unit, a detecting unit for detecting the secondary pressure, a pressure regulating unit for regulating the secondary pressure of the pressure control valve unit, a driving unit for operating the pressure regulating unit, a control unit for controlling the driving unit, and a pressure setting unit for establishing a set pressure.

The control unit controls the driving unit on the basis of the functional relation between the position of the pressure regulating unit and the secondary pressure corresponding to the controlled pressure to adjust the secondary pressure to a desired pressure, namely, to the set pressure.

In one mode for carrying out the present invention, the control unit comprises a computer including arithmetic means, correcting means and memory means.

According to the present invention, when an optional set pressure is established by means of the pressure setting unit, the operating means of the control unit calculates an appropriate position of the pressure regulating member of the pressure regulating unit on the basis of the functional relationship between the secondary pressure and the position of the pressure regulating member and then the control unit provides a control signal to the driving unit to adjust the position of the pressure regulating member to a calculated appropriate position so that the secondary pressure is regulated to the set pressure.

After the secondary pressure has been thus regulated to the set pressure, the self-regulated valve unit starts mechanical pressure control operation in the conventional manner.

When further fine control of the secondary pressure is necessary, it is desirable to provide a secondary pressure detecting means to detect the secondary pressure continuously or periodically and to control the driving unit by a correction signal calculated by the operating means of the control unit on the basis of the difference between the set pressure and the detected secondary pressure to control the second pressure continuously or periodically.

Thus, the self-regulated pressure control valve is capable of rapid response to the variation of the secondary pressure and of instantly regulating the secondary pressure, namely, the controlled pressure, to a set pressure, namely, a target pressure.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWINGS

The above and other objects, features an advantages of the present invention will become more apparent from the following description of the preferred embodiments thereof taken in conjunction with the accompanying drawings, wherein.

DESCRIPTION OF THE PREFERRED EMBODIMENTS

Figure 1:
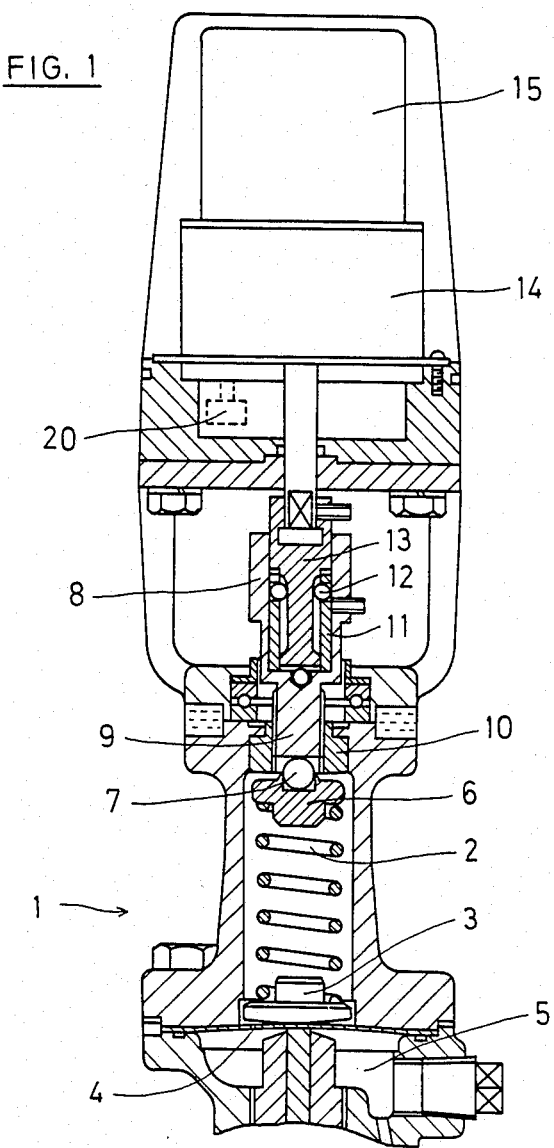
FIG. 1 is a fragmentary sectional view of a self-regulated pressure control valve, particularly showing the pressure regulating unit thereof.

The first embodiment of the present invention depicted in FIG. 1 depicts the application of the invention to a pressure reducing valve 1. Referring to FIG. 1, the pressure reducing valve 1 has a pressure setting spring 2 having one end seated on a spring seat 3 and the other end seated on a spring seat 6. The spring seats 3 and 6 are pressed against the diaphragm 4 and against the lower end, as viewed in FIG. 1, of a pressure regulating screw rod 8 through a ball 7, respectively. The secondary pressure of the pressure reducing valve 1 prevails in a pressure chamber 5 covered with the diaphragm 4.

The position of the diaphragm 4 is dependent on the pressure balance between the pressure applied thereto by the pressure setting spring 2 and the secondary pressure prevailing within the pressure chamber 5. Since the secondary pressure control function of the diaphragm 4 is well known, the description thereof will be omitted.

An external thread 9 is formed in the lower portion of the pressure regulating screw rod 8. A threaded lower end of the pressure regulating rod 8 is screwed in a fixed member provided with an internal thread 10 in the central portion thereof. An axial bore is formed in the upper portion, as viewed in FIG. 1, of the pressure regulating screw rod 8. A retainer 11 retaining balls 12 is inserted in the axial bore of the pressure regulating screw rod 8. A spline shaft 13 is fitted in the axial bore of the pressure regulating screw rod 8 so as to engage with the balls 12. The spline shaft 13 is connected through a reduction gear 14 to the output shaft of a motor 15.

Since the pressure regulating screw rod is engaged with the internal thread 10 of the fixed member, the pressure regulating screw rod 8 is rotated through the spline shaft 13 so as to shift downward when the output shaft of the motor 15 rotates in one direction and, thereby, the pressure setting spring 2 is compressed through the spring seat 6 by the pressure regulating screw rod 8 to increase the set pressure. On the other hand, when the output shaft of the motor 15 rotates in the opposite direction so as to shift upwardly and, thereby, compression of the pressure setting spring 2 is reduced to reduce the set pressure.

Figure 2:
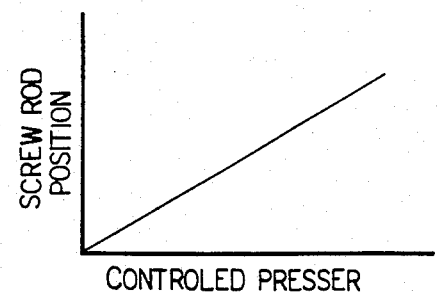
FIG. 2 is a graph showing the relationship between the pressure regulating member of a pressure regulating unit and the controlled pressure.

The distance of shift of the lower end of the pressure regulating screw rod 8 from a predetermined reference position (a position where the lower end of the pressure regulating screw rod 8 is in contact with the spring seat 6 through the ball 7 without compressing the pressure regulating spring), which will be referred to as the "screw rod position", is proportional to the magnitude of compression of the pressure setting spring 2 and, hence, to the set pressure as shown in FIG. 2. The present invention effectively utilizes such a relationship between the distance of shift of the lower end of the pressure regulating screw rod 8 and the set pressure.

Figure 3:
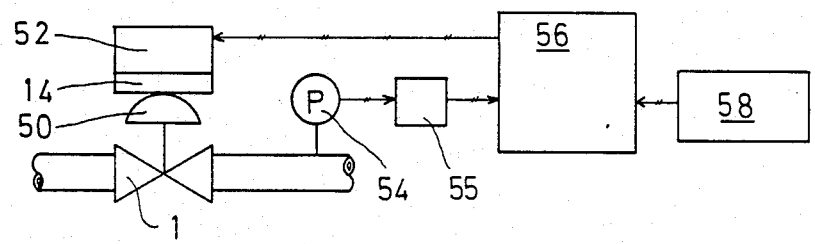
FIG. 3 is a block diagram of a self-regulated pressure control valve according to a first embodiment of the present invention.

Referring to FIG. 3 showing the first embodiment of the present invention, the self-regulated pressure control valve comprises a pressure reducing valve 1, a pressure regulating unit 50 including the pressure regulating screw rod 8, a driving unit 52 including the motor 15, a pressure detecting unit 54, a signal conversion unit 55, a control unit 56 including a computer storing screw rod position data representing the functional relationship between the screw rod position and the controlled pressure, and a pressure setting unit 58. In the first embodiment, the motor 15 is a stepping motor.

The pressure sensor of the pressure detecting unit 54 detects the secondary pressure of the pressure reducing valve 1 and gives a pressure signal representing the secondary pressure to the signal conversion unit 55. Then, the signal conversion unit 55 converts the pressure signal into a corresponding digital pressure signal and then gives the same to the computer of the control unit 56.

Upon the reception of a set pressure signal representing a set pressure from the pressure setting unit 58, the computer calculates a screw rod position corresponding to the set pressure for the pressure regulating screw rod 8 on the basis of the screw rod position data previously stored therein, and then gives a pulse signal corresponding to the calculated screw rod position to the driving unit 52 to drive the pressure regulating unit 50 so that the pressure regulating screw rod 8 is shifted to the calculated screw rod position. Consequently, the secondary pressure of the pressure reducing valve 1 is adjusted instantly to the set pressure. The angle of rotation of the output shaft of the stepping motor 15 is proportional to the number of pulses of the pulse signal and, hence, the position of the pressure regulating screw rod 8 corresponds to the number of pulses of the pulse signal.

The pressure detecting unit 54 detects the secondary pressure continuously or periodically and the signal conversion unit 55 gives digital signals accordingly to the control unit 56. The computer of the control unit 56 compares the detected secondary pressure with the set pressure. When the deviation in the detected secondary pressure from the set pressure is within a predetermined range of deviation, the control unit does not provide any signal to actuate the driving unit 52. When the deviation in the detected secondary pressure from the set pressure is greater than the limit value of the predetermined range of deviation, the computer calculates a distance correction by which the pressure regulating screw rod 8 needs to be shifted to correct the deviation on the basis of the difference between the detected secondary pressure and the set pressure and the screw rod position data stored therein, and then provides a control signal representing the calculated distance correction for secondary pressure correction to actuate the driving unit for shifting the pressure regulating screw rod 8 for fine adjustment of the secondary pressure.

For example, when the set pressure is 5 kg/cm$^2$, the reference range of deviation is ±0.1 kg/cm$^2$ and the detected secondary pressure is 4.5 kg/cm$^2$. The computer calculates a distance correction corresponding to the pressure deviation of 0.5 kg/cm$^2$ on the basis of the screw rod position data to shift the pressure regulating screw rod 8 accordingly.

For further advanced pressure control, digital data representing the functional relation between the set pressure and the screw rod position, for example, a predetermined correlation between the set pressure and the screw rod position represented by set pressures of 1 kg/cm$^2$ intervals and the corresponding screw rod positions is stored in the table of the memory means of the computer and the control operation and correcting operation are executed on the basis of the digital data according to the predetermined correlation. When a correction is made, the digital data representing the previous screw rod position is replaced with the corrected data representing the new screw rod position to update the table of the memory means.

For example, suppose that screw rod positions S4 and S5 stored in the memory means of the computer correspond to set pressures, more specifically, to set secondary pressures, 4 and 5 kg/cm$^2$, respectively, when the valve is set for the set pressure 5 kg/cm$^2$ by means of the pressure setting means, the motor drives the pressure regulating screw rod to the corresponding screw rod position S5. When a reference deviation range is ±0.1 kg/cm$^2$, the motor remains stopped while the deviation of the actual secondary pressure from the set pressure is within the reference deviation range.

Suppose that the set pressure is 5 kg/cm$^2$, the reference deviation range is ±0.1 kg/cm$^2$ and the current secondary pressure is 4.5 kg/cm$^2$. The computer then calculates a screw deviation: 5.0−4.5=0.5 kg/cm$^2$ by using the following equation:

$$\Delta S = (S5 - S4) \times 0.5/(5-4).$$

The motor then drives the pressure regulating screw rod by the calculated screw rod position correcting displacement ΔS to increase the secondary pressure from 4.5 kg/cm$^2$ to 5.0 kg/cm$^2$. The initial screw rod position S5 stored in the memory means is then replaced with S5+ΔS.

When the same set pressure is given to the control unit to regulate the controlled pressure to the same target pressure after the pressure regulating screw rod 8 has been shifted from the previous screw rod position to change the set pressure, the computer calculates the true screw rod position to instantly regulate the secondary pressure to the target pressure.

When the pressure control system of the self-regulated pressure control valve is thus constituted, the pressure control system generates an ideal control data even when the operating condition of the pressure reducing valve is varied so that the self-regulated pressure control valve is able to operate at a high response speed.

Figure 4:
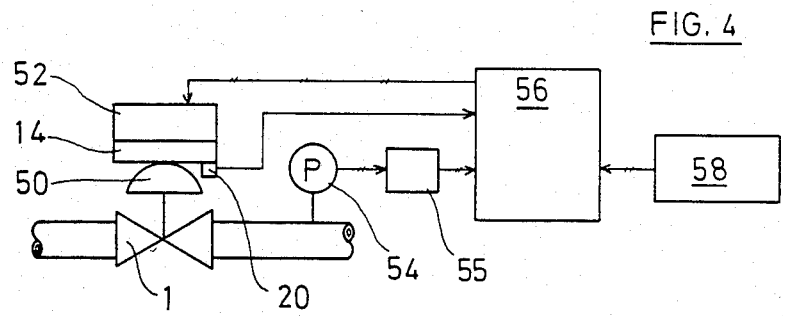
FIG. 4 is a block diagram of a self-regulated pressure control valve according to a second embodiment of the present invention.

A second embodiment of the invention is shown in FIG. 4 and incorporates the mechanism shown in FIG. 1. Basically, the second embodiment is the same as the first embodiment in constitution and function. The second embodiment employs a rotary potentiometer for detecting the position of the pressure regulating screw rod 8 and a reversible motor instead of the stepping motor for driving the pressure regulating screw rod 8.

Referring to FIG. 4, the second embodiment comprises a pressure reducing valve 1, a pressure regulating unit 50, a driving unit 52, a pressure detector 54, a signal converter 55, a control unit 66, a pressure setting unit 58, a reduction gear 14, and a rotary potentiometer 20.

Referring to FIG. 1, the rotary potentiometer 20 is operatively interlocked with one of the gears (not shown) of the reduction gear 14. The output voltage of the potentiometer 20 is proportional to the distance of shift of the pressure regulating screw rod 8 from the reference position (a position where the pressure regulating screw rod is in engagement with the pressure setting spring 2 without compressing the latter), namely, the screw rod position. Accordingly, the output voltage of the rotary potentiometer 20 represents the screw rod position, hence, the secondary pressure, namely, the controlled pressure. In the second embodiment, the screw rod position data representing the functional relationship between the screw rod position represented by the output voltage of the rotary potentiometer 20 and the secondary pressure is stored in the computer.

The rotary potentiometer 20 may be substituted by a linear potentiometer or a differential transformer. When a linear potentiometer is employed, the arm of the linear potentiometer is arranged so as to move linearly together with the pressure regulating screw rod 8. When a differential transformer is employed, the core of the differential transformer is arranged so as to move linearly together with the pressure regulating screw rod 8.

The control unit 56 gives a signal continuously to the driving unit 52 until the output signal of the rotary potentiometer 20, namely, the screw rod position signal, coincides with a signal given to the control unit 56 by means of the pressure setting unit 58. Since the rest of the functions are the same as those of the first embodiment, the description thereof will be omitted to avoid duplication.

Figure 5:
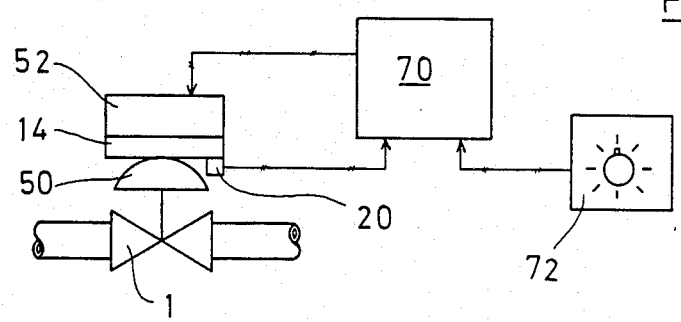
FIG. 5 is a block diagram of a self-regulated pressure control valve according to a third embodiment of the present invention.

A third embodiment of the invention is shown in FIG. 5. Referring to FIG. 5, the third embodiment comprises a pressure reducing valve 1, a reduction gear 14, a rotary potentiometer 20, a pressure regulating unit 50, a driving unit 52, a control unit 70 and a pressure setting unit 72 including a potentiometer.

The control unit 72 does not include any computer. The third embodiment is capable of most simply controlling the secondary pressure on the basis of the relationship between the screw rod position and the secondary pressure, namely, the controlled pressure. The rotary potentiometer 20 operatively connected to the reduction gear 14 gives a voltage signal representing a screw rod position corresponding to the secondary pressure to the control unit 70, while the potentiometer of the pressure setting unit 72 gives a voltage signal representing a set pressure to the control unit 72. The control unit 72 compares the voltage signal representing the screw rod position and the voltage signal representing the set pressure, and then gives a control signal to the driving unit 52 to shift the pressure regulating screw rod until the voltage signal provided by the rotary potentiometer 20 coincides with the voltage signal representing the set pressure.

The rotary potentiometer 20 may be substituted for by a linear potentiometer or a differential transformer as mentioned in the description of the second embodiment.

Figure 6:
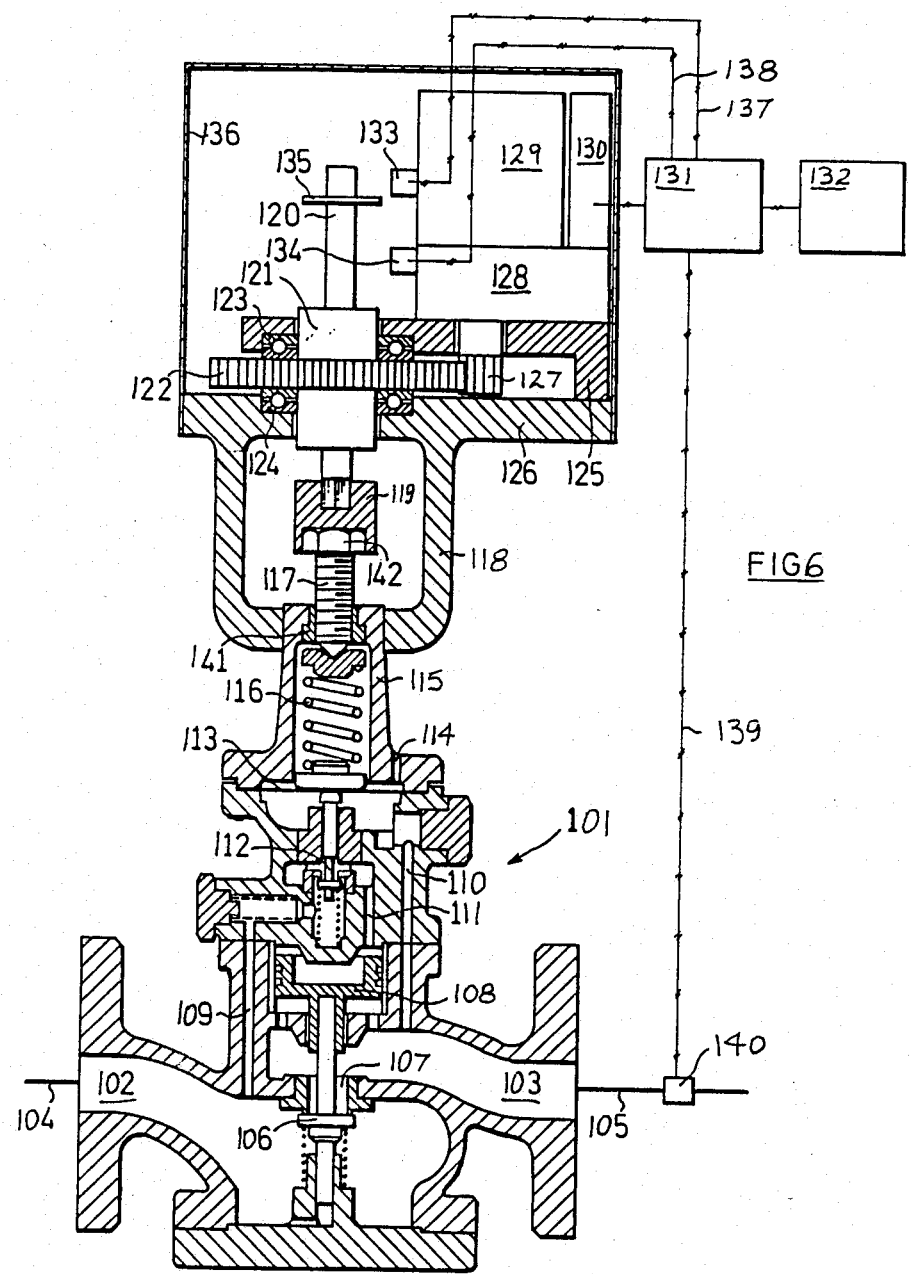
FIG. 6 is a sectional view of the pressure reducing valve as disclosed in the parent application Ser. No. 770,845 identified above.

Referring now to FIG. 6, the automatically set pressure reducing valve of this embodiment is shown as comprising a mechanical pressure reducing valve portion 101, an electric motor portion and a control portion.

The valve portion 101 is similar in construction to a known pressure reducing valve. It has a fluid inlet 102 and a fluid outlet 103 which are connected to a primary passage 104 and a secondary passage 105, respectively. It has a main valve port 107 which can be opened or closed by a main valve member 106. The valve member 106 is urged by a spring into its port closing position and connected by a valve rod to a piston 108.

The pressure of the fluid flowing through the main valve port 107 to the fluid outlet 103 acts on the lower surface of the piston 108, while the pressure of the fluid acting on the upper surface of the piston 108 through passages 109 and 111 is controlled by a pilot valve member 112. The pilot valve member 112 is urged by a spring into its closing position and is connected to a valve rod contacting the lower surface of a diaphragm 113 so that its downward displacement may force the pilot valve member 112 into its open position.

If the diaphragm 113 is displaced downwardly, the pilot valve member 112 is forced down to allow the fluid to flow from the fluid inlet 102 into the area above the piston 108 through the passages 109 and 111 and lower the piston 108 and thereby the main valve member 106, whereby the main valve port 107 is opened to allow the fluid to flow from the fluid inlet 102 to the fluid outlet 103. If the diaphragm 113 is displaced upwardly, the pilot valve member 112 is forced up by the spring to break the fluid communication between the passages 109 and 111 and the fluid in the area above the piston 108 flows to the fluid outlet 103 through the passage 111, a clearance surrounding the valve rod for the pilot valve member 122 and a passage 110, whereby the main valve member 106 and the piston 108 are forced up to close the main valve port 107.

The area above the diaphragm 113 is connected with the open atmosphere by a passage 114 of small diameter and kept at a substantially uniform atmospheric pressure. A pressure setting spring 116 has a lower end contacting the upper surface of the diaphragm 113 and exerts a resilient force thereon. The upper end of the spring 116 is carried on a spring support and an adjust screw 117 has a lower end contacting the spring support so that the rotation of the adjust screw 117 in either direction may adjust the compression of the spring 116 and thereby its resilient force acting on the diaphragm 113. The adjust screw 117 is threadedly engaged with an internally threaded member fitted in a spring housing 115 forming a part of a valve housing.

The motor portion is connected to the valve portion 101 by a yoke 118 secured to the spring housing 115. An output shaft 120 is coaxial with the adjust screw 117 and has a lower end connected to the hexagonal head 142 of the screw 117 by a connecting member 119.

The output shaft 120 defines a shaft for a ball spline 121. A gear 122 is secured to the outer periphery of the spline 121 and held between upper and lower bearing members 123 and 124 against vertical and radial displacement. The bearing members 123 and 124 are held between a mounting plate 125 and a bottom plate 126. An electric motor 129 and a speed reducer 128 are secured on the mounting plate 125 and its output shaft 127 is threadedly engaged with the gear 122.

If the motor 129 is driven, the output shaft 127 of the speed reducer 128 is rotated to rotate the outer periphery of the spline 121 via the gear 122. Depending on the direction of its rotation, the output shaft 120 is rotated for upward or downward movement, causing the rotation of the adjust screw 117 in either direction via the connecting member 119.

The output shaft 120 is provided with a disk 135 which enables the detection of the adjust screw 117 when it is brought to its uppermost or lowermost position. A pair of position sensors 133 and 134 are located on one side of the disk 135 for detecting it in the uppermost and lowermost positions, respectively, of the screw 117. The sensors 133 and 134 are secured on the sidewalls of the motor 129 and the speed reducer 128, respectively.

The sensors 133 and 134 are preferably photosensors of the reflective type, though it is, of course, possible to use any other type of sensor, such as potentiometers, limit switches or magnetic sensors.

A driver 130 is located beside the motor 129. The motor portion is enclosed in a cover 136 which protects it against dust and moisture. The motor portion further includes the necessary wiring and terminals (not shown).

The control portion comprises the position sensors 133 and 134, a comparative controller 131, a target pressure setter 132 and a pressure sensor 140 disposed in the secondary fluid passage. Signal lines 137 and 138 extend from the position sensors 133 and 134, respectively, to the comparative controller 131. A signal line 139 extends from the pressure sensor 140 to the comparative controller 131. A signal line also extends from the comparative controller 131 to the driver 130. The comparative controller 131 may alternatively be located at the driver 130.

A target pressure is set by the setter 132 and inputted to the comparative controller 131. The pressure of the fluid in the secondary passage 105 is detected by the pressure sensor 140 and inputted to the comparative controller 131 continuously or at relatively short intervals. The comparative controller 131 calculates the difference between the pressure of the fluid in the secondary passage 105 as detected by the sensor 140 and the target pressure and compares it with a standard difference.

If the comparison indicates a deviation of the detected difference from the standard difference, the comparative controller 131 transmits a control signal to the driver 130 in order to bring the detected difference t virtually zero, i.e., bring the pressure of the fluid in the secondary passage 105 to substantially the target pressure. The motor 129 is driven by the driver 130 to adjust the flow o the fluid through the valve. The comparative controller 131 transmits a control signal to the driver 130 to stop the operation of the motor 129 if the detected difference has become virtually zero, i.e., fallen within a range of fine standard differences which are sufficiently smaller than the standard difference hereinabove stated.

The position sensors 133 and 134 cooperate with the disk 135 to detect the adjust screw 117 in its uppermost and lowermost positions, respectively, and transmit the corresponding signals to the comparative controller 131. The comparative controller 131 responds to both of those signals more quickly than to any other control signal and transmits a signal to the driver 130 to stop the operation of the motor 129. This makes it possible to prevent the application of any undue force to the system for controlling the adjust screw 117.

As will be noted from the description set forth above, the invention produces a number of special advantages. The actuator functions only when the detected difference has deviated from the standard difference, and ceases to function when the detected difference has been brought to virtually zero. It follows that the actuator is not placed in operation often or for any long time continuously, and that the valve has by far a longer life than any automatic control valve.

If the pressure reducing valve is of the type including a pilot valve, the pilot valve is actuated by a small force to operate a main valve which requires a large force for operation. As the pressure setting spring has a small resilient force, it is sufficient to employ an actuator having a small output.

The actuator is easily applicable to any existing pressure reducing valve, insofar as it is provided for axially moving the adjust screw for the spring.

If the difference between the secondary fluid pressure and the set pressure exceeds the standard difference, the actuator functions to alter the set pressure to enable a greater amount of fluid to flow. Therefore, the valve of this invention enables quicker control in the case of any variation in secondary fluid pressure than any pressure reducing valve relying solely on mechanical control.

While specific embodiments of the invention have been shown and described in detail to illustrate the application of the inventive principles, it will be understood that the invention may be embodied otherwise without departing from such principles.

What is claimed is:

1. A self-regulated pressure control valve comprising:
a pressure control valve;
pressure setting means for establishing a set pressure;
pressure regulating means having a pressure regulating element which is movable for regulating a controlled pressure of said pressure control valve;
driving means for driving said pressure regulating means to move said pressure regulating element;
position data means for relating the position of said pressure regulating element to the controlled pressure of said pressure control valve based on a predetermined functional relationship between the position of the pressure regulating element and the controlled pressure; and
control means connected to said position data means for controlling the operation of said driving means on the basis of a set pressure established by said pressure setting means and the predetermined functional relationship between the position of the pressure regulating element of said pressure regulating means and the controlled pressure so that the pressure regulating element of said pressure regulating means is shifted to a position to regulate the controlled pressure to the set pressure.

2. A control valve according to claim 1, wherein said control means includes computer, said position data means comprising means for storing control data representing said predetermined functional relationship between the position of the pressure regulating element of said pressure regulating means and the controlled pressure position detecting means for detecting the position of said pressure regulating element, said computer being connected to said means for storing and calculating a position where said pressure regulating element is to be positioned on the basis of said control data and a set pressure signal provided by said pressure setting means, the position of said pressure regulating element is detected by means of said position detecting means, and said control means controlling the operation of said driving means so as to drive said pressure regulating means until the detection signal of said position detecting means coincides with a signal representing the position calculated by the computer of said control means on the basis of the control data and the signal representing the set pressure.

3. A control valve according to claim 1, wherein said control means includes a computer, said position data means comprising means that stores control data representing the predetermined functional relationship between the position of the pressure regulating element of said pressure regulating means and the controlled pressure, said driving means includes a stepping motor, and said computer being connected to said means that stores and calculates, on the basis of a set pressure signal given thereto from said pressure setting means, a pulse signal having pulses of a number corresponding to a position where said pressure regulating element is to be positioned, and then gives the pulse signal to the stepping motor to regulate the controlled pressure to the set pressure.

4. A control valve according to claim 2 or 3, further comprising a controlled pressure detecting means for detecting the controlled pressure, wherein the detection signal provided by said controlled pressure detecting means and the set pressure signal provided by said pressure setting means are compared continuously or periodically by said control means to determine the deviation of the controlled pressure from the set pressure, and wherein, if there is any significant deviation of the controlled pressure from the set pressure, the computer calculates a distance correction by which the pressure regulating element of said pressure regulating means needs to be shifted from the current position on the basis of the deviation and the control data stored in the computer to correct the controlled pressure so that the controlled pressure coincides with the set pressure.

5. A control valve according to claim 4, wherein the position of the pressure regulating element of said pressure regulating means determined by said control unit through the operation of the difference between the controlled pressure signal representing the detected controlled pressure and the set pressure signal representing the set pressure is stored in the computer as a new correct position of the pressure regulating element of said pressure regulating means.

6. A control valve according to claim 1 wherein said control means controls said driving means so as to operate until the detection signal corresponding to the position of the pressure regulating element of said pressure regulating means detected by a potentiometer or the like of position detecting means coincides with the set pressure signal representing a set pressure provided by a potentiometer or the like of said pressure setting means.

7. An automatically set pressure reducing valve comprising:
   fluid passage means defining a primary side and a secondary side of said valve;
   valve means controlling flow through said fluid passage means between said primary side and said secondary side;
   a diaphragm for actuating said valve means, said diaphragm being exposed on one side to said secondary side of said fluid passage means;
   pressure setting spring means operatively associated with said diaphragm for determining an operating pressure at which said valve means open and close;
   means for adjusting the resilient force of said spring means;
   actuator means responsive to fluid pressure on said secondary side of said fluid passage means for controlling said adjusting means to determine said operating pressure in response to changes in pressure on said secondary side, said actuator means comprising an actuator element, the pressure on the secondary side varying according to a predetermined function with the position of the actuator element; and
   control means including means for establishing a target value for a set pressure and means for sensing difference between said target value and the pressure on said secondary side, said target value being established based on the predetermined functional relationship between the pressure on said secondary side and the position of said actuator element;
   said actuator means being placed in operation when a differences detected between the pressure on said secondary side and said target value is larger than a standard difference, with said actuator means being placed out of operation when said detected difference has become smaller than said standard difference.

8. A valve according to claim 7, wherein said actuator means comprises a threaded member engaging said pressure setting spring means and electrical motor means actuated by said control means for driving said threaded member to increase or decrease the setting of said pressure setting spring means.

9. A valve according to claim 8, further comprising position sensor mean sensing the position of said threaded member and operative to terminate operation of said electrical motor means to limit movement of said threaded member to between two terminal positions.

* * * * *